United States Patent
Yi et al.

(10) Patent No.: US 8,743,065 B2
(45) Date of Patent: Jun. 3, 2014

(54) METHOD OF IDENTIFYING A MULTI-TOUCH ROTATION GESTURE AND DEVICE USING THE SAME

(75) Inventors: Lianfang Yi, Shenzhen (CN); Tiejun Cai, Shenzhen (CN); Xianwu Zeng, Shenzhen (CN); Bangjun He, Shenzhen (CN); Yun Yang, Shenzhen (CN)

(73) Assignee: BYD Company Limited (CN)

( * ) Notice: Subject to any disclaimer, the term of this patent is extended or adjusted under 35 U.S.C. 154(b) by 152 days.

(21) Appl. No.: 13/277,037

(22) Filed: Oct. 19, 2011

(65) Prior Publication Data
US 2012/0249440 A1    Oct. 4, 2012

(30) Foreign Application Priority Data
Mar. 31, 2011 (CN) .......................... 2011 1 0081899

(51) Int. Cl.
*G06F 3/041* (2006.01)

(52) U.S. Cl.
USPC ........ 345/173; 345/174; 715/863; 178/18.01; 178/18.07

(58) Field of Classification Search
CPC ..... G06F 3/046; G06F 3/044; G06F 3/04883; G06F 2203/04808; G06F 2203/04104; G06F 3/017; G06F 3/0488; G06F 3/03547; G06F 3/041; G06F 3/0412
USPC ................... 345/173–178; 178/18.01–18.11; 715/863
See application file for complete search history.

(56) References Cited

U.S. PATENT DOCUMENTS

| | | | |
|---|---|---|---|
| 2002/0036618 A1* | 3/2002 | Wakai et al. | 345/157 |
| 2006/0026521 A1* | 2/2006 | Hotelling et al. | 715/702 |
| 2007/0109280 A1* | 5/2007 | Sigona | 345/177 |
| 2008/0180399 A1* | 7/2008 | Cheng | 345/173 |
| 2009/0183930 A1* | 7/2009 | Yang et al. | 178/18.03 |
| 2009/0184939 A1* | 7/2009 | Wohlstadter et al. | 345/173 |
| 2009/0195518 A1* | 8/2009 | Mattice et al. | 345/177 |
| 2009/0201261 A1* | 8/2009 | Day | 345/173 |
| 2009/0256857 A1* | 10/2009 | Davidson et al. | 345/619 |
| 2010/0033436 A1* | 2/2010 | Lai et al. | 345/173 |
| 2010/0039405 A1* | 2/2010 | Chen et al. | 345/174 |
| 2010/0088595 A1* | 4/2010 | Ho et al. | 715/702 |
| 2010/0328249 A1* | 12/2010 | Ningrat et al. | 345/174 |
| 2011/0148804 A1* | 6/2011 | Yeh et al. | 345/174 |
| 2011/0242025 A1* | 10/2011 | Wen et al. | 345/173 |

* cited by examiner

*Primary Examiner* — Koosha Sharifi-Tafreshi
(74) *Attorney, Agent, or Firm* — Alston & Bird LLP

(57) ABSTRACT

A method of identifying a rotation gesture comprises detecting one or more induction signals induced by one or more pointing objects that come into contact with a touch-sensitive surface, determining the number of pointing objects, detecting movement statuses of the detected pointing objects, determining a rotation gesture performed by the pointing objects based on the movement statuses, generating a control signal associated with the determined rotation gesture and executing the rotation gesture in response to the generated control signal.

25 Claims, 12 Drawing Sheets

METHOD OF IDENTIFYING A MULTI-TOUCH ROTATION GESTURE AND DEVICE USING THE SAME

CROSS-REFERENCE TO RELATED APPLICATION

This application claims priority under 35 U.S.C. §119 to Chinese Patent Application No. 201110081899.0, filed on Mar. 31, 2011, the content of which is incorporated herein by reference in its entirety.

TECHNICAL FIELD

Example embodiments of the present disclosure relate generally to a method of identifying gestures on a touchpad, and more particularly, to a method of identifying a rotation gesture and device thereof.

BACKGROUND

Although the keyboard remains a primary input device of a computer, the prevalence of graphical user interfaces (GUIs) may require use of a mouse or other pointing device such as a trackball, joystick, touch device or the like. Due to its compact size, the touch device has become popular and widely used in various areas of our daily lives, such as mobile phones, media players, navigation systems, digital cameras, digital cameras, digital photo frame, personal digital assistance (PDA), gaming devices, monitors, electrical control, medical equipment and so on.

A touch device features a sensing surface that can translate the motion and position of a user's fingers to a relative position on screen. Touchpads operate in one of several ways. The most common technology includes sensing the capacitive virtual ground effect of a finger, or the capacitance between sensors. For example, by independently measuring the self-capacitance of each X and Y axis electrode on a sensor, the determination of the (X, Y) location of a single touch is provided.

SUMMARY

According to one exemplary embodiment of the present invention, a method of identifying multi-touch points comprises a method of identifying a rotation gesture comprises detecting one or more induction signals induced by one or more pointing objects that come into contact with a touch-sensitive surface, determining the number of pointing objects, detecting movement statuses of the detected pointing objects, determining a rotation gesture performed by the pointing objects based on the movement statuses, generating a control signal associated with the determined rotation gesture and executing the rotation gesture in response to the generated control signal.

According to one exemplary embodiment of the present invention, a method of identifying a rotation gesture comprises a device of identifying multi-touch points comprises a detecting module, configured to detect one or more induction signals induced by one or more pointing objects that come into contact with a touch-sensitive surface, a determination module, configured to determine the number of pointing objects, a rotation gesture determining module, configured to detect movement statuses of the detected pointing objects and determine a rotation gesture performed by the pointing objects based on the movement statuses, a signal generation module, configured to generate a control signal associated with the determined rotation gesture and a processing unit, configured to execute the rotation gesture in response to the generated control signal.

BRIEF DESCRIPTION OF THE DRAWINGS

Figure 1:
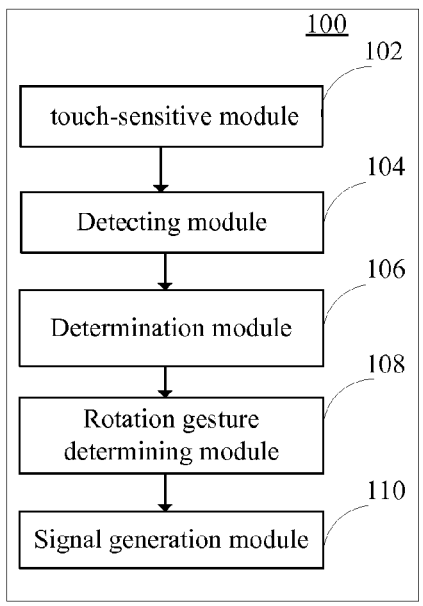
Figure 2:
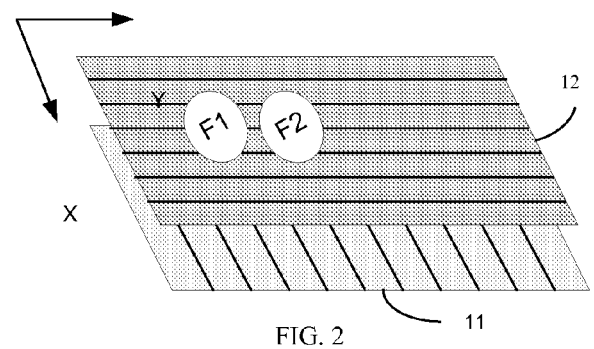
Figure 3:
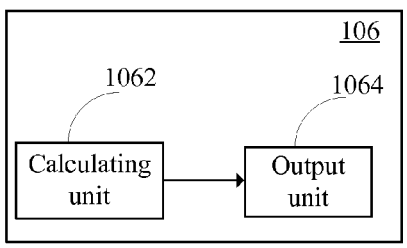
Figure 4:
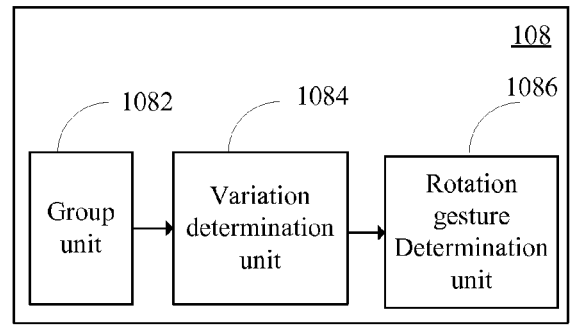
Figure 5:
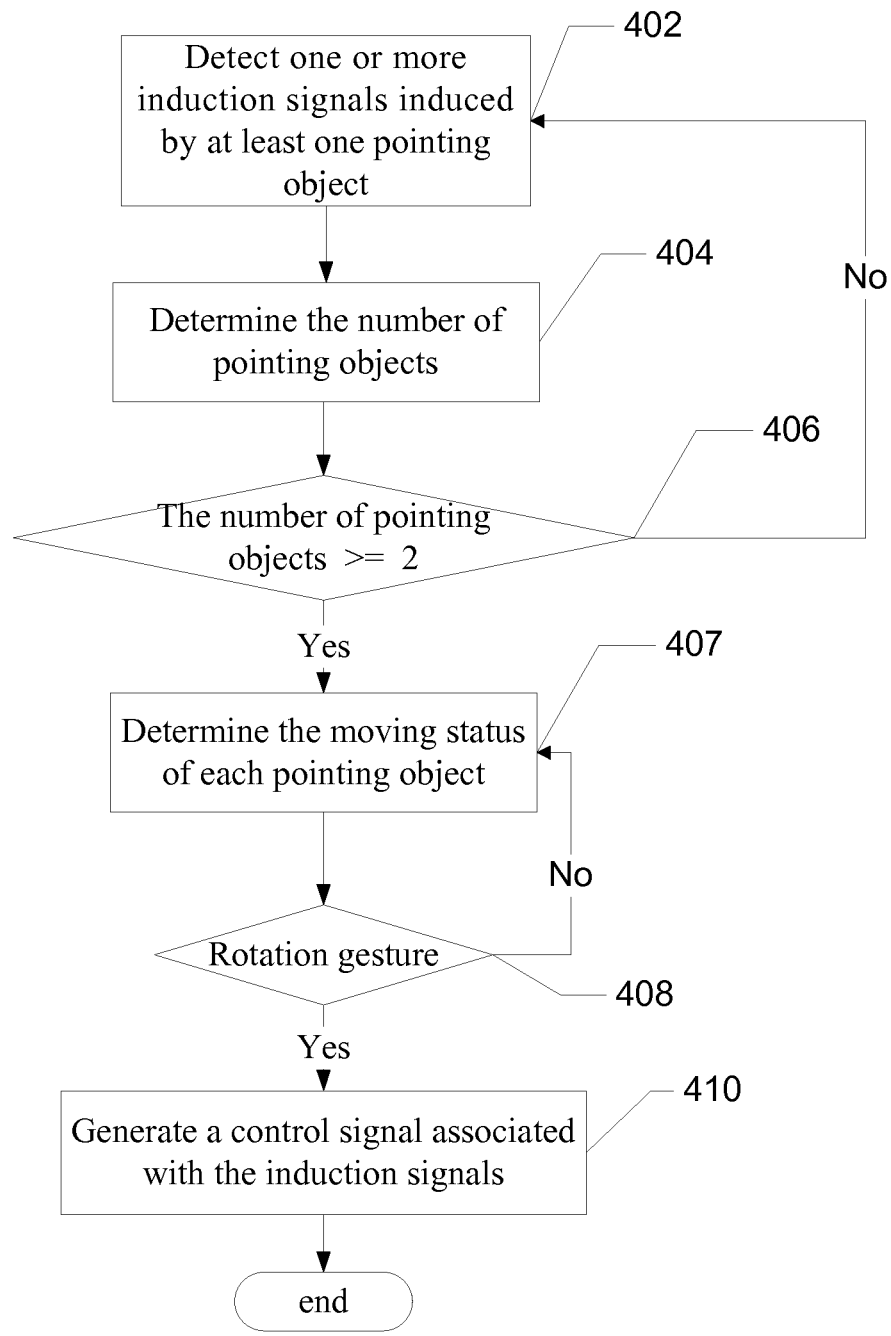
Figure 6:
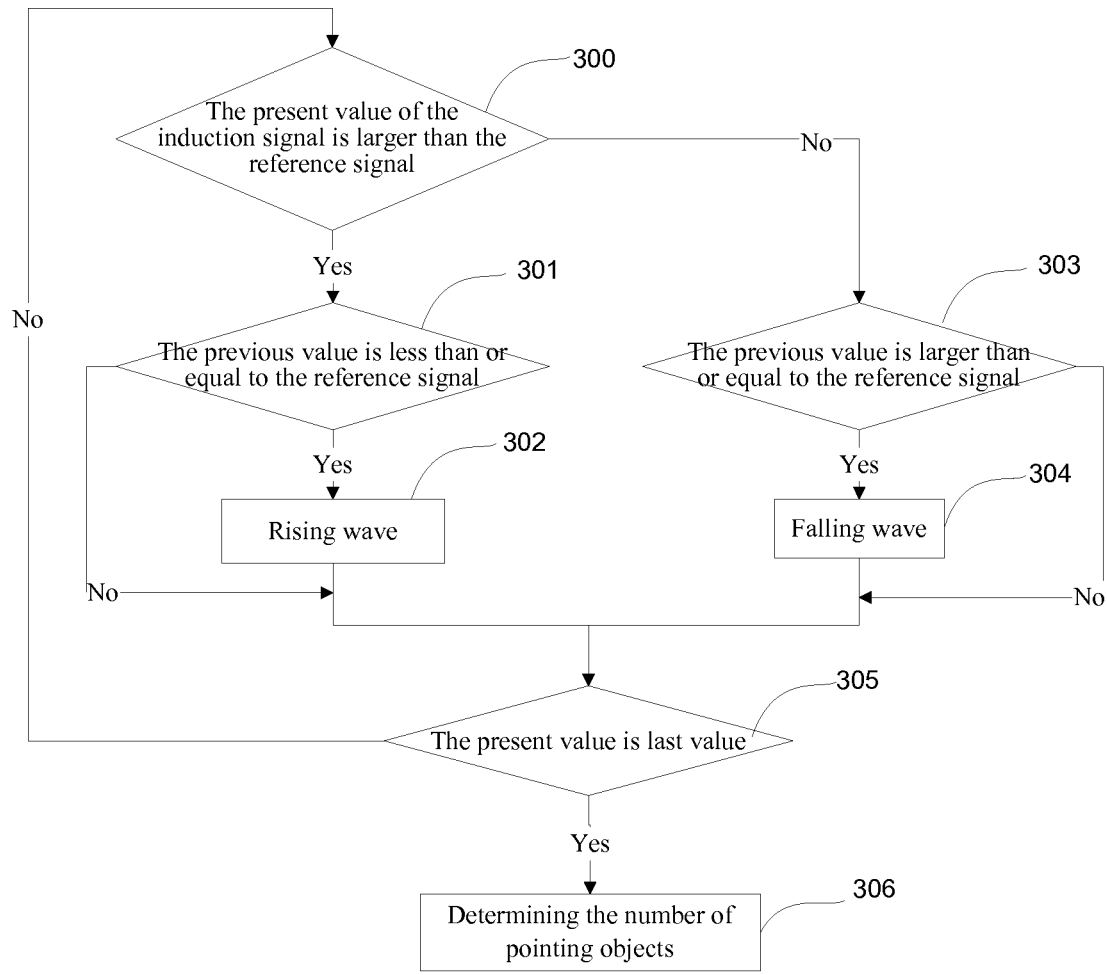
Figure 7:
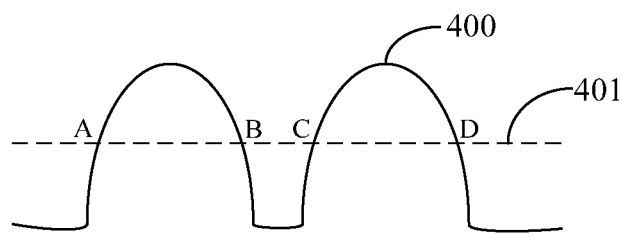
Figure 8:
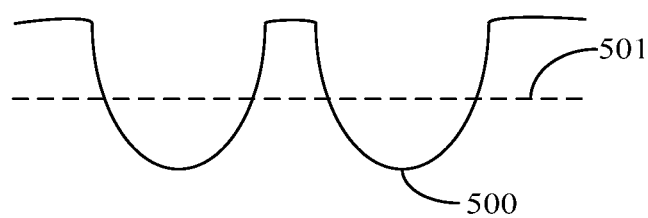
Figure 9:
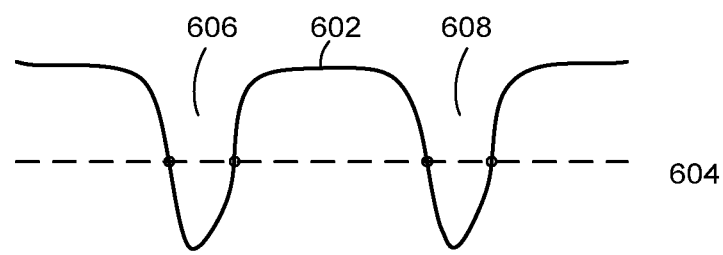
Figure 10:
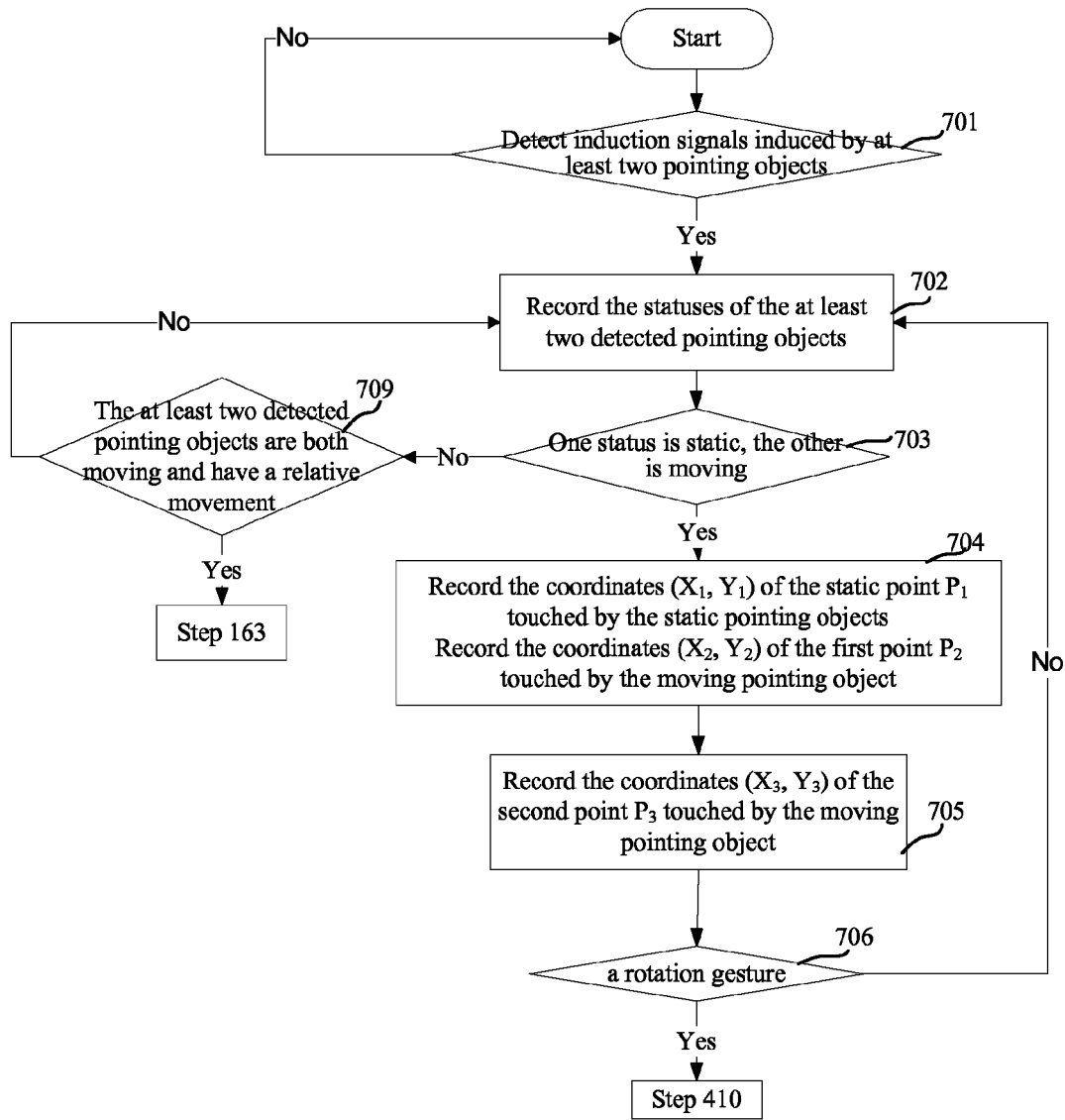
Figure 11:
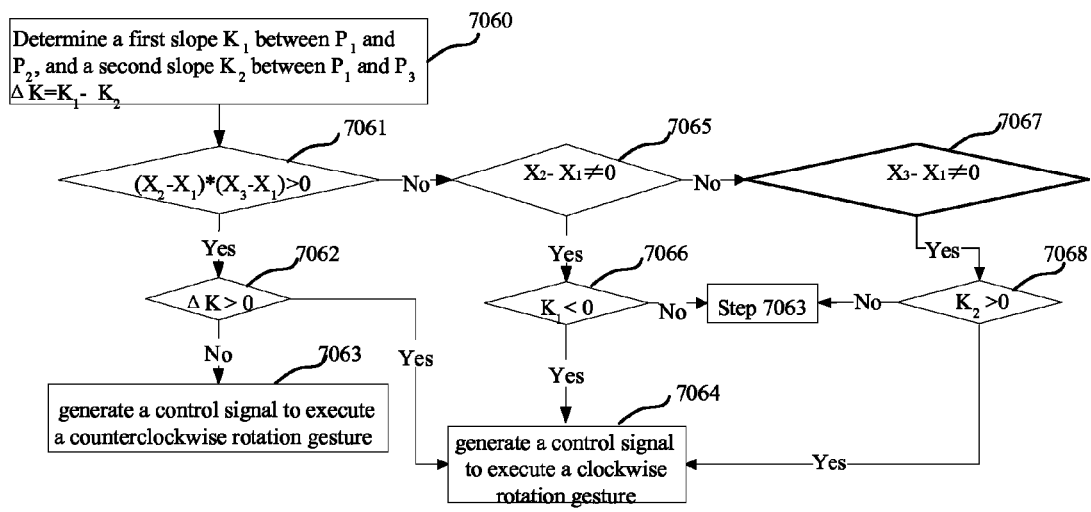
Figure 12:
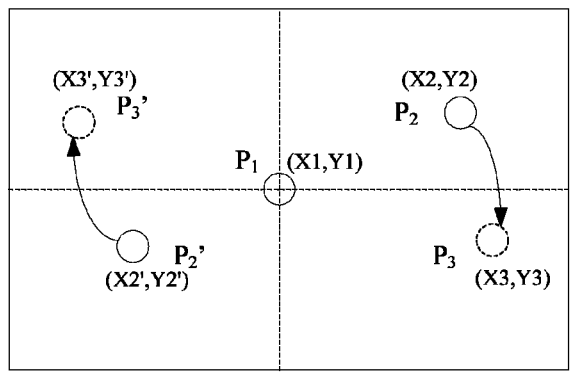
Figure 13:
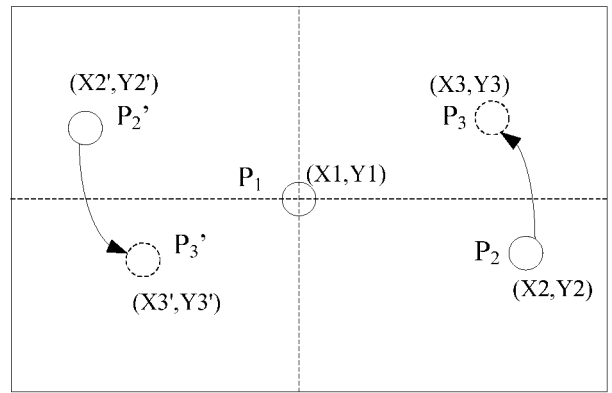
Figure 14:
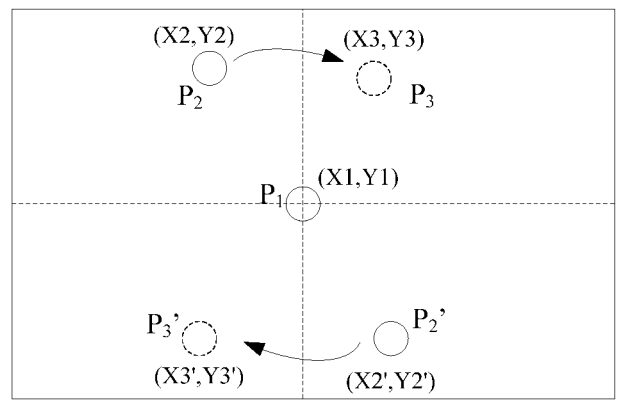
Figure 15:
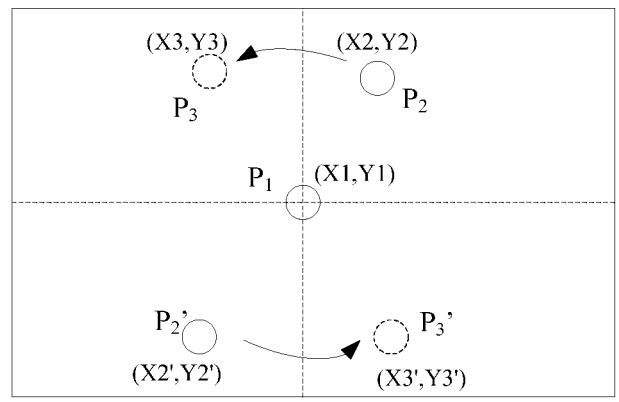
Figure 16:
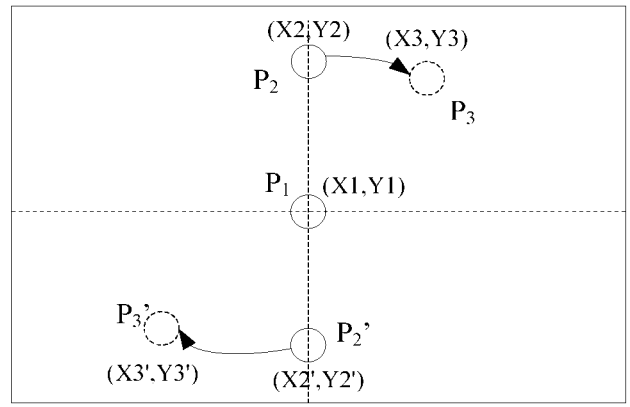
Figure 17:
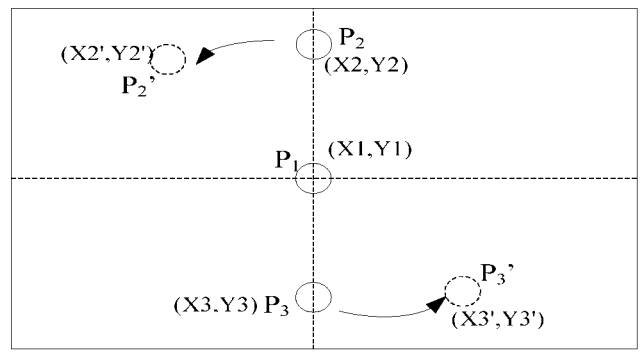
Figure 18:
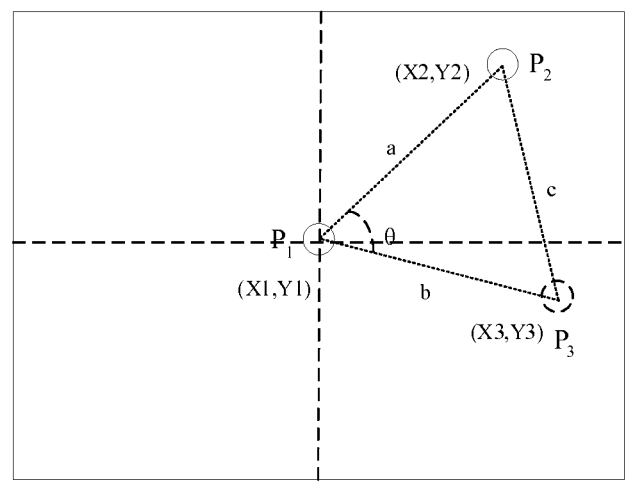
Figure 19:
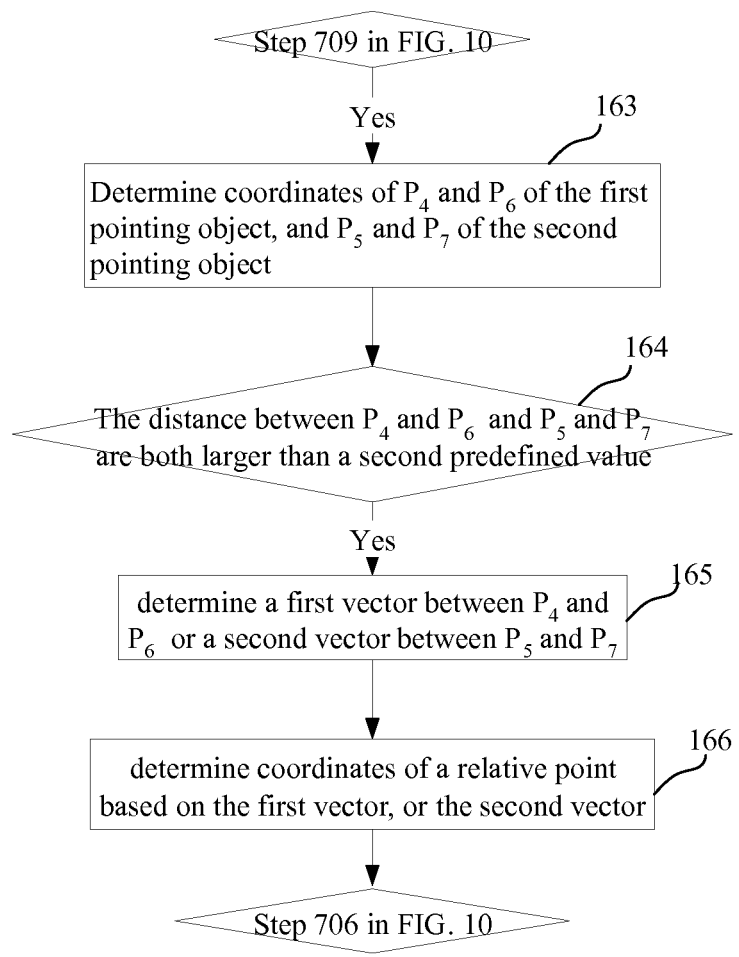

Having thus described example embodiments of the present disclosure in general terms, reference will now be made to the accompanying drawings, which are not necessarily drawn to scale, and wherein:

FIG. 1 illustrates a block diagram of an identification module according to one exemplary embodiment of the present invention;

FIG. 2 illustrates a schematic diagram of inductive lines on a touch screen according to one exemplary embodiment of the present invention;

FIG. 3 illustrates a block diagram of a determination module according to one exemplary embodiment of the present invention;

FIG. 4 is a block diagram of a rotation gesture determining module according to one exemplary embodiment of the present invention;

FIG. 5 illustrates a method of identifying a rotation gesture according to one exemplary embodiment of the present invention;

FIG. 6 illustrates a method of identifying the number of pointing objects that contact the touch screen according to one exemplary embodiment of the present invention;

FIGS. 7-9 illustrate diagrams of a detected induction signal and a reference signal according to one exemplary embodiment of the present invention;

FIG. 10 illustrates a method of detecting a rotation gesture according to one exemplary embodiment of the present invention;

FIG. 11 illustrates a method of identifying a rotation gesture at step 706 of FIG. 10 according to one exemplary embodiment of the present invention;

FIGS. 12, 14 and 16 illustrate schematic diagrams of a clockwise rotation gesture according to exemplary embodiments of the present invention;

FIGS. 13, 15 and 17 illustrate schematic diagrams of a counterclockwise rotation gesture according to exemplary embodiments of the present invention;

FIG. 18 is a schematic diagram of illustrating a rotation angle of a rotation gesture according to one exemplary embodiment of the present invention;

FIG. 19 illustrates a method of identifying a rotation gesture after step 709 in FIG. 7 according to one exemplary embodiment of the present invention; and FIGS. 20A-20E are schematic diagrams illustrating instances of FIG. 19 according to exemplary embodiments of the present invention.

DETAILED DESCRIPTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In this regard, although example embodiments may be described herein in the context of a touch screen or touch-screen panel, it should be understood that example embodiments are equally applicable to any of a number of different types of touch-sensitive surfaces, including those with and without an integral display (e.g., touchpad). Also, for example, references may be made herein to axes, directions and orientations including X-axis, Y-axis, vertical, horizontal, diagonal, right and/or left; it should be understood, however, that any direction and orientation references are simply examples and that any particular direction or orientation may depend on the particular object, and/or the orientation of the particular object, with which the direction or orientation reference is made. Like numbers refer to like elements throughout.

FIG. 1 illustrates a schematic diagram of an identification module 100 according to an exemplary embodiment of the present invention ("exemplary" as used herein referring to "serving as an example, instance or illustration"). As explained below, the identification module 100 may be configured to determine a gesture and generate corresponding control signals based on coordinates of multi-touch points on a touch screen. The identification module 100 may be configured to provide the control signals and other related information to a processing unit (not shown) of a terminal application device to execute the gesture applied to the touch screen. The terminal application device may be any of a number of different processing devices including, for example, a laptop computer, desktop computer, server computer, or a portable electronic devices such as a portable music player, mobile telephone, portable digital assistant (PDA), tablet or the like. Generally, the terminal application device may include the processing unit, memory, user interface (e.g., display and/or user input interface) and/or one or more communication interfaces. The touch screen may be a resistive touch screen, a capacitive touch screen, an infrared touch screen, an optical imaging touch screen, an acoustic pulse touch screen, surface acoustic touch screen or in any other forms.

As illustrated in FIG. 1, the identification module 100 may include a touch-sensitive module 102, a detecting module 104, a determination module 106, a rotation gesture determining module 108, and a signal generation module 110. The touch-sensitive module 102 of one example may be as illustrated in FIG. 2. The determination module 106 may include a calculating unit 1062 and an output unit 1064 as illustrated in FIG. 3. The rotation gesture determining module 108 may include a group unit 1082, a variation unit 1084 and a rotation gesture determination unit 1086 as illustrated in FIG. 4.

FIG. 2 illustrates a schematic diagram of a touch-sensitive surface according to one exemplary embodiment of the present invention. The touch-sensitive module 102 may include a plurality of inductive lines 11 and 12 on respective X and Y axes to form the touch-sensitive surface. In other exemplary embodiments, the touch-sensitive module 102 may comprise an acoustic sensor, optical sensor or other kind of sensor to form a touch-sensitive surface for sensing the touch by the pointing objects. The X and Y axes may be perpendicular to each other, or have a specific angle other than 90°. As also shown, F1 and F2 indicate two touch points on the touch-sensitive module 102 by two pointing objects according to an exemplary embodiment. The touch-sensitive module 102 may be embodied in a number of different manners forming an appropriate touch-sensitive surface, such as in the form of various touch screens, touchpads or the like. As used herein, then, reference may be made to the touch-sensitive module 102 or a touch-sensitive surface (e.g., touch screen) formed by the touch-sensitive module.

In operation, when a pointing object, such as a user's finger or a stylus is placed on the touch screen, the touch-sensitive module 102 may generate one or more induction signals induced by the pointing object. The generated induction signals may be associated with a change in electrical current, capacitance, acoustic waves, electrostatic field, optical fields or infrared light. The detecting module 104 may detect the induction signals associated with the change induced by one or more pointing objects, such as two pointing objects in one or more directions on the touch screen. In an instance in which two pointing objects are simultaneously applied to the touch screen, the calculating module 1062 may determine the number of pointing objects applied to the touch screen based on the number of rising waves and/or the number of falling waves of the induction signal. The output unit 1064 may output the calculated result to the rotation gesture determining module 108. The calculating module 1062 may comprise a comparison unit (not shown) to compare values of the detected induction signal with a reference signal to determine at least one of the number of rising waves and the number of falling waves of the detected induction signal.

In one exemplary embodiment, there may be a plurality of pointing objects in contact with the touch screen. For example, one pointing object is static and the other two or more pointing objects rotate about the static pointing object. In this instance, the group unit 1082 may group two or more pointing objects into a group by comparing distance between two adjacent touch points to a first predefined value. The variation determination unit 1084 may obtain relative movements of each group of pointing objects. Based on the result obtained by the variation determination unit 1084, the rotation gesture determination unit 1086 may determine whether the two groups of pointing objects perform a rotation gesture. The signal generation module 110 may generate corresponding control signals. The processing unit may be configured to interact with the terminal application device based on the control signals, such as by executing a rotation on a display of the terminal application device.

As described herein, the touch-sensitive module 102 and the processing unit are implemented in hardware, alone or in combination with software or firmware. Similarly, the detecting module 104, determination module 106, the rotation gesture determination module 108 and the signal generation module 110 may each be implemented in hardware, software or firmware, or some combination of hardware, software and/or firmware. As hardware, the respective components may be embodied in a number of different manners, such as one or more CPUs (Central Processing Units), microprocessors, coprocessors, controllers and/or various other hardware devices including integrated circuits such as ASICs (Application Specification Integrated Circuits), FPGAs (Field Programmable Gate Arrays) or the like. As will be appreciated, the hardware may include or otherwise be configured to communicate with memory, such as volatile memory and/or non-volatile memory, which may store data received or calculated by the hardware, and may also store one or more software or firmware applications, instructions or the like for the hardware to perform functions associated with operation of the device in accordance with exemplary embodiments of the present invention.

FIG. 5 illustrates various steps in a method of identifying a rotation gesture according to one exemplary embodiment of the present invention. When a pointing object, such as a finger, comes into contact with the touch screen at a touch point, the touch-sensitive module 102 may sense the contact and generate one or more induction signals. The detection module 104 may detect the induction signals induced by the pointing object at step 402. In an instance in which two or more pointing objects are simultaneously applied to the touch screen, the number of the pointing objects may be obtained by the determination module 106 at step 404. In an instance in which the number of pointing objects is determined to be larger than or equal to two at step 406, the rotation gesture determining module 108 may determine the moving status of each pointing object at step 407.

The rotation gesture determining module 108 may determine if an applied gesture is a rotation or not based on the moving status at step 408. In instances in which the gesture is determined as a rotation gesture, the signal generation module 110 may generate a control signal associated with the detected induction signals at step 410. The generated control signal may be passed to the processing unit, which may then execute an operation associated with the generated control signal. In an instance in which the number of the pointing objects is less than two, the identification module 100 may await and detect a next induction signal induced by one or more pointing objects at step 402. In an instance in which the gesture applied to the touch screen is not a rotation gesture at step 408, the identification module 100 may continue to detect and determine the moving status of the pointing objects at step 407. When the moving status of the pointing objects satisfy the conditions set at step 408, the method proceeds to generate associated control signal.

FIG. 6 illustrates a method of determining the number of pointing objects that contact the touch screen according to one exemplary embodiment of the present invention. When at least one pointing object is in contact with the touch screen, an induction signal sensed and generated by the touch-sensitive module 102 may be detected by the detecting module 104.

At step 300, a present value of the induction signal is compared to a reference signal by the comparison unit 1062. In an instance in which the present value is larger than the reference signal, a previous value of the induction signal is compared to the reference signal by the comparison unit (not shown) of the calculating unit 1062. In an instance in which the previous value is less than or equal to the reference signal at step 301, the wave is determined as a rising wave at step 302. In an instance in which the previous value is larger than or equal to the reference signal, the determination module 106 may determine if the present value is the last value in the induction signal at step 305. If it is determined as the last value, the number of pointing objects may be determined at step 306 based on the number of rising waves and/or the number of falling waves and may be output by the output unit 1064 to the rotation gesture determining module 108.

In an instance in which the present value is less than or equal to the reference signal at step 300, the previous value is compared to the reference signal at step 303. In an instance in which the previous value is larger than or equal to the reference signal, the wave is determined as a falling wave at step 304. The process may proceed to step 305 to determine if the present value is the last value in the induction signal. In an instance in which the present value is not the last value in the induction signal at step 305, the process may otherwise proceed to select a next value and compare the next value to the reference signal at step 301. In an exemplary embodiment, if the number of the rising waves is not equal to that of the falling waves, the process may await next induction signals. In one exemplary embodiment, a first initial induction value and a second initial induction value may be predetermined. In the exemplary embodiment as illustrated in FIG. 7, the first initial induction value and the second initial induction value are predetermined less than the reference signal. In another exemplary embodiment as illustrated in FIG. 8, the first initial induction value and the second initial induction value are predetermined larger than the reference signal. In this manner, the first value of the detected induction signal may be compared to the predetermined first initial induction signal. The last value of the detected signal may be compared to the predetermined second initial induction signal.

FIG. 7 illustrates a diagram of a detected induction signal 400 and a reference signal 401 according to one exemplary embodiment of the present invention. In an instance in which a pointing object comes into contact with the touch screen at a touch point, the contact at that touch point may induce the touch-sensitive module 102 to generate an induction signal 400. Accordingly, the number of rising waves or the number of falling waves may corresponds to the number of pointing objects that are in contact with the touch screen. The rising wave may cross the reference signal at points A and C (referred as "rising point"). The falling wave may cross the reference signal at points B and D (referred as "drop point"). Due to some unexpected noises, the induction signal may not be induced by a valid contact of a pointing object. To determine whether an induction signal induced by a valid contact, the distance between one rising point and a subsequent drop point may be measured and compared to a predetermined threshold value by the calculating unit 1062. If the distance is larger than the predetermined threshold value, the induction signal is determined to be induced by a valid touch. For example, the distance between the rising point A and its subsequent drop point B may be measured and compared to a predetermined threshold value.

Different induction signal waves may be obtained due to different analyzing methods or processing methods. FIG. 8 illustrates an induction signal 500 induced by a contact with the touch screen and a reference signal 501 according to an exemplary embodiment. The method of determining a valid contact at a touch point and the number of touch points may be similar to that is described above.

Touch points may be determined by measuring the attenuation of waves, such as ultrasonic waves, across the surface of the touch screen. For instance, the processing unit may send a first electrical signal to a transmitting transducer. The transmitting transducer may convert the first electrical signal into ultrasonic waves and emit the ultrasonic waves to reflectors. The reflectors may refract the ultrasonic waves to a receiving transducer. The receiving transducer may convert the ultrasonic waves into a second electrical signal and send it back to the processing unit. When a pointing object touches the touch screen, a part of the ultrasonic wave may be absorbed causing a touch event that may be detected by the detecting module 104 at that touch point. Coordinates of the touch point are then determined. An attenuated induction signal 602 crossed by a reference signal 604 and two attenuation parts 606 and 608 are illustrated in FIG. 9.

FIG. 10 illustrates a method of detecting a rotation gesture according to one exemplary embodiment of the present invention. There may be a plurality of pointing objects that simultaneously come into contact with the touch screen to perform a gesture, and which pointing objects may induce a plurality of detectable induction signals at step 701. To determine the number of pointing objects that come into contact with the touch screen, the distance between each two adjacent touch points may be measured. When the distance between two adjacent touch points is less than a first predefined value, the pointing objects that touch these two adjacent touch points may be grouped by the group unit 1082. For instance, five fingers may come into contact with the touch screen. Four fingers may rotate about the thumb. Distance between each two adjacent fingers may be measured. In this scenario, the distances between the index finger and the middle finger, the middle finger and the ring finger, the ring finger and the little finger may be less than the first predefined value. The thumb may then be determined as a first group of pointing object. The index finger, the middle finger, the ring finger and the little finger may be grouped as a second group of pointing objects by the group unit 1082.

When it is determined that there are at least two pointing objects that come into contact with the touch screen at step 701, the moving statuses of respective pointing objects may be recorded at step 702, and the statuses of the groups of the pointing objects may be determined. To describe concisely, each group of pointing objects comprise one pointing object in describing following steps in this embodiment. In one instance in which one pointing object may be static and the other pointing object may be moving at step 703, coordinates $(X_1, Y_1)$ of the static point $P_1$ associated with the static pointing object and $(X_2, Y_2)$ of the first point $P_2$ associated with the moving pointing object at step 704 may be recorded. The coordinate $(X_3, Y_3)$ of the second touch point $P_3$ associated with the moving pointing object may be recorded at step 705. At step 706, the rotation gesture determination unit 1086 may determine if the at least two pointing objects are operating a rotation gesture, which will be detailed in FIG. 11. In an instance in which the operation is determined as a rotation gesture, an associated control signal may be generated by the signal generation module 110. A rotation operation that is associated with the generated control signal may be executed. In an instance in which the operation is not a rotation gesture, the method proceeds back to step 702. In an instance in which the two pointing objects are both moving and have relative movement, the method proceeds to step 709. It will be described in detail in FIG. 19.

FIG. 11 illustrates a method of identifying a specific rotation gesture at step 706 of FIG. 10 according to one exemplary embodiment of the present invention. Referring back to FIG. 10, in an instance in which one pointing object is determined as static and the other pointing object is determined as moving, coordinates $(X_1, Y_1)$ of the static point $P_1$ associated with the static pointing object, $(X_2, Y_2)$ of the first point $P_2$ and $(X_3, Y_3)$ of the second point $P_3$ that are associated with the moving pointing object are recorded by the variation determination unit 1084. In this instance, the first point $P_2$ is defined as a start touch point associated with the moving pointing object. The second point $P_3$ is defined as an end touch point associated with the moving pointing object. At step 7060, a first slope $K_1$ between the static point $P_1$ and the first point $P_2$, and a second slope $K_2$ between the static point $P_1$ and the second point $P_3$, are calculated. The difference between the first slope $K_1$ and the second slope $K_2$ defined as $\Delta K$, i.e., $\Delta K = K_1 - K_2$. The start touch point may be to the left or the right of the static point, or above or below the static point. Similarly, the end point may be to the left or the right of the static point, or above or below the static point. In various combinations, clockwise rotation or counterclockwise rotation gestures may be executed.

In an instance in which $(X_2-X_1)*(X_3-X_1)>0$ at step 7061, and $\Delta K>0$ at step 7062, the gesture applied to the touch screen may be illustrated as FIG. 12. A clockwise rotation gesture may be executed at step 7063. In an instance in which $\Delta K<0$ at step 7062, a counterclockwise rotation gesture may be executed at step 7064, as illustrated in FIG. 13. In an instance in which $(X_2-X_1)*(X_3-X_1)\leq 0$ and $X_2-X_1 \neq 0$ at step 7065, when the first slope $K_1<0$ at step 7066, a clockwise rotation gesture may be executed at step 7064 as illustrated in FIG. 14. In an instance in which the first slope $K_1>0$, a counterclockwise rotation gesture may be executed at step 7063, as illustrated in FIG. 15. In an instance in which $X_2-X_1=0$ and $X_3-X_1 \neq 0$ at step 7067, and $K_2>0$ at step 7068, a clockwise rotation gesture may be executed at step 7064. The corresponding clockwise rotation gesture is illustrated as FIG. 16. In an instance in which $K_2<0$ at step 7068, a counterclockwise rotation gesture may be executed at step 7063. The corresponding counterclockwise rotation gesture is illustrated as FIG. 17.

FIG. 18 is a schematic diagram illustrating a rotation angle of a rotation gesture according to one exemplary embodiment of the present invention. When a control signal associated with a rotation gesture is generated, the control signal may comprise information about the rotation angle. The rotation angle may be defined between the line connecting the static point $P_1$ and the start touch point $P_2$, and the line connecting the static touch point $P_1$ and the end touch point $P_3$. The rotation angle may be obtained through various mathematic methods, such as tangent, vector or cosine. In one instance, the rotation angle is obtained through cosine. $a = \sqrt{(x2-x1)^2+(y2-y1)^2}$, $b = \sqrt{(x3-x1)^2+(y3-y1)^2}$, $c = \sqrt{(x3-x2)^2+(y3-y2)^2}$, $$\text{rotation angel } \theta = \arccos \frac{a^2 + b^2 - c^2}{2ab}.$$

When the rotation angle $\theta$ is larger than a predefined angle, a control signal associated with this rotation gesture may be generated to execute a corresponding operation on the terminal application device, such as volume adjustment, photo rotation, paging and the like.

Figure 20A:
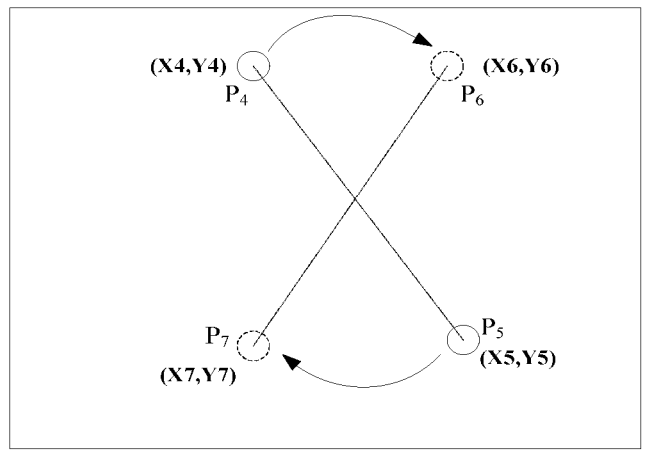
Figure 20B:
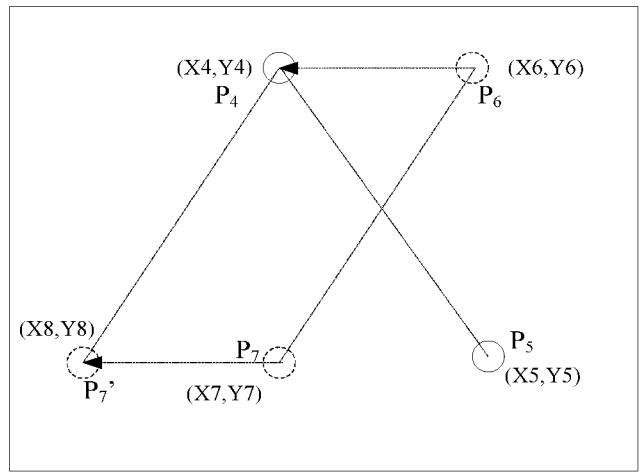
Figure 20C:
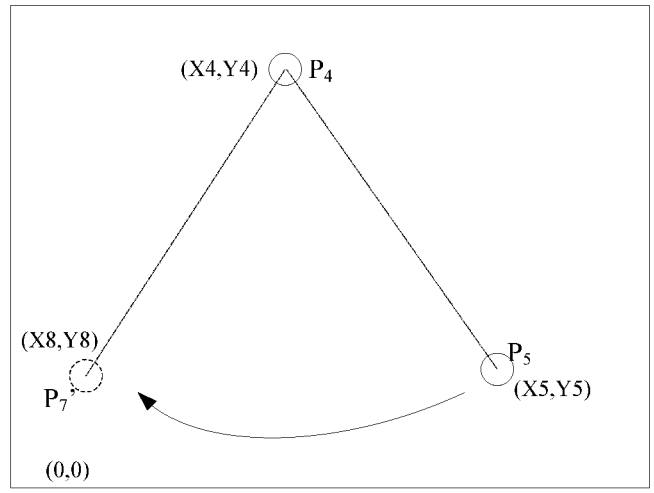

Referring back to FIG. 10, in an instance in which both pointing objects are moving and one has a movement relative to the other, the method proceeds to step 709. At step 163 with reference to FIG. 20A, coordinates $(X_4, Y_4)$ of a start touch point $P_4$, and $(X_6, Y_6)$ of an end touch point $P_6$, associated with the first pointing object, may be recorded by the variation determination unit 1084. Similarly, coordinates $(X_5, Y_5)$ of a start touch point $P_5$, and $(X_7, Y_7)$ of an end touch point $P_7$, associated with the second pointing object may be recorded by the variation determination unit 1084. The distance between the start touch point $P_4$ and the end touch point $P_6$, and distance between the start touch point $P_5$ and the end touch point $P_7$, may be measured by the rotation gesture determination unit 1086. In an instance in which the measured distances are both larger than a second predefined value at step 164, a first vector $(P_4, P_6)$ between $P_4$ and $P_6$, or a second vector $(P_5, P_7)$ between $P_5$ and $P_7$, may be calculated at step 165. To determine if the gesture is a rotation gesture, the start touch point $P_4$ of the first pointing object may be presumed as a static point. In this manner, the end touch point $P_7$ associated with the second pointing object may be presumed as shifting to a shift end point $P_7'(X_8, Y_8)$ associated with the first vector $(P_4, P_6)$, as illustrated in FIG. 20B. As the gesture applied to the touch screen, it may be presumed that the second pointing object rotates about the start touch point $P_4$ from the start point $P_5$ to the shift end point $P_7'$, as illustrated in FIG. 20C. A first slope between the start touch point $P_4$ and the touch point $P_5$ may be obtained. A first shift slope between the start touch point $P_4$ and the shift end point $P_7'$ may be obtained. A rotation gesture based on the first slope and the first shift slope may be determined.

Figure 20D:
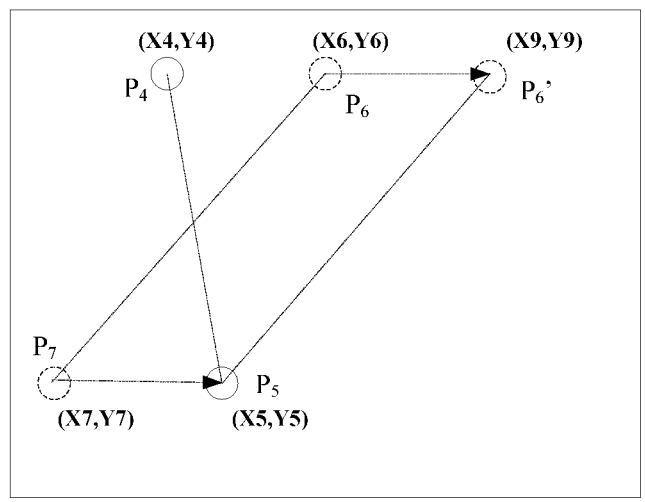
Figure 20E:
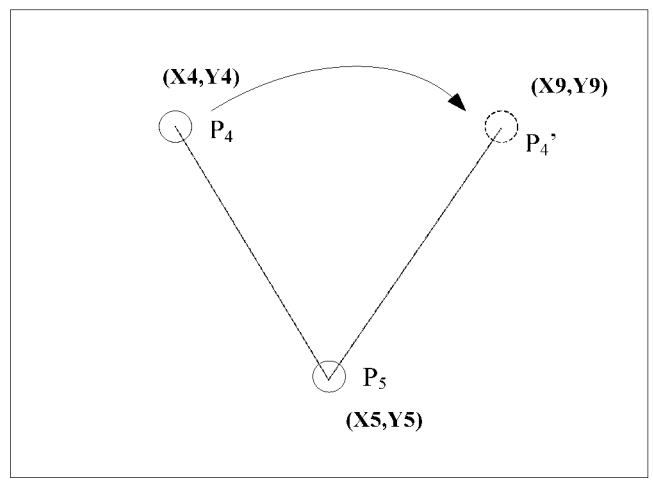

Similarly, as illustrated in FIG. 20D, the start touch point $P_5$ may be presumed as a static point. The end touch point $P_6$ associated with the first pointing object may be presumed as shifting to a shift end point $P_6'(X_9, Y_9)$ by the second vector $(P_5, P_7)$. In this manner, as the gesture applied to the touch screen, it may be presumed that the first pointing object rotates about the start touch point $P_5$ from the start touch point $P_4$ to the point $P_6'$ as illustrated in FIG. 20E. Then the method proceeds to step 706 in FIG. 10 to further identify the rotation gesture that has been applied to the touch screen. A second slope between the start touch point $P_4$ and the touch point $P_5$ may be obtained. A first shift slope between the start touch point $P_s$ and the shift end point $P_6'$ may be obtained. A rotation gesture based on the second slope and the second shift slope may be determined.

All or a portion of the system of the present invention, such as all or portions of the aforementioned processing unit and/or one or more modules of the identification module 100, may generally operate under control of a computer program product. The computer program product for performing the methods of embodiments of the present invention includes a computer-readable storage medium, such as the non-volatile storage medium, and computer-readable program code portions, such as a series of computer instructions, embodied in the computer-readable storage medium.

FIGS. 5, 6, 10, 11 and 19 are flowcharts of methods, systems and program products according to the invention. It will be understood that each block or step of the flowcharts, and combinations of blocks in the flowcharts, can be implemented by computer program instructions. These computer program instructions may be loaded onto a computer or other programmable apparatus to produce a machine, such that the instructions which execute on the computer or other programmable apparatus create means for implementing the functions specified in the block(s) or step(s) of the flowcharts. These computer program instructions may also be stored in a computer-readable memory that can direct a computer or other programmable apparatus to function in a particular manner, such that the instructions stored in the computer-readable memory produce an article of manufacture including instruction means which implement the function specified in the block(s) or step(s) of the flowcharts. The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the block(s) or step(s) of the flowcharts.

Accordingly, blocks or steps of the flowcharts support combinations of means for performing the specified functions, combinations of steps for performing the specified functions and program instruction means for performing the specified functions. It will also be understood that each block or step of the flowcharts, and combinations of blocks or steps in the flowcharts, can be implemented by special purpose hardware-based computer systems which perform the specified functions or steps, or combinations of special purpose hardware and computer instructions.

It will be appreciated by those skilled in the art that changes could be made to the examples described above without departing from the broad inventive concept. It is understood, therefore, that this invention is not limited to the particular examples disclosed, but it is intended to cover modifications within the spirit and scope of the present invention as defined by the appended claims.

What is claimed is:

1. A method of identifying a rotation gesture comprising:
   detecting one or more induction signals induced by one or more pointing objects that come into contact with a touch-sensitive surface, each induction signal generating a signal wave;
   selecting a first point and a second point of each signal wave;
   comparing a first value of the first point to a reference value to obtain a first comparison result;
   comparing a second value of the second point to the reference value to obtain a second comparison result;
   determining a rising wave or a falling wave based upon the first comparison result and the second comparison result;
   determining the number of pointing objects based upon the number of rising waves or the number of falling waves;
   detecting movement status of each pointing object;
   determining a rotation gesture performed by the pointing objects based on the movement status of each pointing object;
   generating a control signal associated with the rotation gesture; and
   executing the rotation gesture in response to the generated control signal.

2. The method of claim 1 further comprising:
   identifying one or more rising points on the rising wave intercepted by the reference signal;
   identifying one or more drop points on the falling wave intercepted by the reference signal; and
   comparing a distance between a rising point and a drop point adjacent to the rising point to determine if the detected induction signal is induced by a valid contact.

3. The method of claim 2, further comprising:
   detecting a first induction signal in a first direction; and
   detecting a second induction signal in a second direction, wherein the first direction and the second direction have an angle.

4. The method of claim 3, furthering comprising:
   determining the number of the pointing objects according to the number of rising waves or falling waves of each induction signal.

5. The method of claim 1, wherein the pointing objects come into contact with the touch-sensitive surface at respective touch points, and wherein the method further comprises:
   obtaining a distance between each two adjacent touch points on the touch-sensitive surface based on coordinates of each touch point;
   comparing the distance to a first predefined value;
   dividing the pointing objects that are detected to induce the induction signals into groups based on the comparison.

6. The method of claim 1, wherein the pointing objects come into contact with the touch-sensitive surface at respective touch points, wherein the pointing objects include a first pointing object and a second pointing object, and wherein determining a rotation gesture comprises:
   obtaining coordinates of a first start touch point and a first end touch point associated with the first pointing object, and a second start touch point and a second touch end point associated with the second pointing object;
   calculating a first distance between the first start touch point and the first end touch point, and a second distance between the second start touch point and the second touch end point, based on the obtained coordinates; and
   comparing the first distance and the second distance to a second predefined value to determine a rotation gesture performed by the first pointing object and the second pointing object.

7. The method of claim 6, wherein determining a rotation gesture further comprises:
   obtaining a first slope between the first start touch point and the second start touch point;

obtaining a second slope between the first start touch point and the second end touch point; and determining a rotation gesture based on the first slope and the second slope.

8. The method of claim 6, wherein determining a rotation gesture further comprises:

obtaining an angle by which the second pointing object rotates about the first pointing object; and determining a rotation gesture based on the angle.

9. The method of claim 6, wherein determining a rotation gesture further comprises:

determining a rotation gesture based on the coordinates of the first start touch point, the second start touch point and the second end point.

10. The method of claim 6, wherein determining a rotation gesture further comprises:

calculating a first vector between the first start touch point and the first end touch point associated with the first pointing object based on the obtained coordinates;

calculating coordinates of a first shift end point relative to the second end touch point by the first vector;

obtaining a first slope between the first start touch point and the second start touch point;

obtaining a first shift slope between the first start touch point and the first shift end point; and determining a rotation gesture based on the first slope and the first shift slope.

11. The method of claim 6, wherein determining a rotation gesture further comprises:

calculating a second vector between the second start touch point and the second end touch point associated with the second pointing object based on the obtained coordinates;

calculating coordinates of a second shift end point relative to the first end touch point by the second vector;

obtaining a first slope between the first start touch point and the second start touch point;

obtaining a first shift slope between the second start touch point and the second shift end point; and determining a rotation gesture based on the first slope and the first shift slope.

12. The method of claim 1, wherein detecting one or more induction signals comprises detecting at least one of a change in electrical current, capacitance, acoustic waves, electrostatic field, optical fields or infrared light to determine the one or more induction signals.

13. The method of claim 1, wherein the rotation gesture comprises a clockwise rotation gesture or a counterclockwise rotation gesture.

14. A device of identifying a rotation gesture comprising:

a detecting module, configured to detect one or more induction signals induced by one or more pointing objects that come into contact with a touch-sensitive surface, each induction signal generating a signal wave;

a calculating unit, configured to compare a first value of a first point to a reference value to obtain a first comparison result, compare a second value of a second point to the reference value to obtain a second comparison result, the first point and the second point being selected from each signal wave, and determine a rising wave or a falling wave based upon the first comparison result and the second comparison result, determine the number of pointing objects based upon the number of rising waves or the number of falling waves;

a rotation gesture determining module configured to detect movement status of each pointing object;

a signal generation module configured to generate a control signal associated with the rotation gesture; and a processing unit configured to execute the rotation gesture in response to the generated control signal.

15. The device of claim 14 further comprising a touch-sensitive module, wherein the touch-sensitive module configured to generate the one or more induction signals induced by the one or more pointing objects.

16. The device of claim 14, wherein the detecting module configured to detect a change in at least one of electrical current, capacitance, acoustic waves, electrostatic field, optical fields and infrared light to determine the one or more induction signals.

17. The device of claim 14, wherein the detecting module configured to detect a first induction signal in a first direction and detect a second induction signal in a second direction, wherein the first direction and the second direction have an angle.

18. The device of claim 14, wherein the rotation gesture determining module comprises a group unit, configured to obtain a distance between each two adjacent touch points on the touch-sensitive surface based on coordinates of each touch point, compare the distance to a first predefined value; and divide two or more pointing objects that are detected to induce the induction signals into groups based on the comparison.

19. The device of claim 14, wherein the rotation gesture determining module further comprises a variation determination unit, configured to determine movement statuses of the detected pointing objects.

20. The device of claim 14, wherein the rotation gesture determining module further comprises a rotation gesture determination unit, configured to:

obtain coordinates of a first start touch point and a first end touch point associated with the first pointing object, and the second start touch point and a second touch end point associated with a second pointing object;

calculate a first distance between the first start touch point and the first end touch point and a second distance between the second start touch point and the second touch end point based on the obtained coordinates; and compare the first distance and the second distance to a second predefined value to determine a rotation gesture performed by the first pointing object and the second pointing object.

21. The device of claim 20, wherein the rotation gesture determining further comprises a rotation gesture determining unit, configured to obtain a first slope between the first start touch point and the second start touch point;

obtain a second slope between the first start touch point and the second end touch point; and determine a rotation gesture based on the first slope and the second slope.

22. The device of claim 20, wherein the rotation gesture determining module is configured to determine a rotation gesture based on the coordinates of the first start touch point, the second start touch point and the second end point.

23. The device of claim 20, wherein the rotation gesture determining module is configured to:

calculate a first vector between the first start touch point and the first end touch point associated with the first pointing object based on the obtained coordinates;

calculate coordinates of a first shift end point relative to the second end touch point by the first vector;

obtain a first slope between the first start touch point and the second start touch point;

obtain a first shift slope between the first start touch point and the first shift end point; and determine a rotation gesture based on the first slope and the first shift slope.

24. The device of claim 20, wherein the rotation gesture determining module configured to:

calculating a second vector between the second start touch point and the second end touch point associated with the second pointing object based on the obtained coordinates;

calculating coordinates of a second shift end point relative to the first end touch point by the second vector;

obtaining a first slope between the first start touch point and the second start touch point;

obtaining a first shift slope between the second start touch point and the second shift end point; and determining a rotation gesture based on the first slope and the first shift slope.

25. The method of claim 1, wherein the drop point adjacent to the rising point is one of a drop point subsequent to the rising point and a drop point preceding the rising point.

* * * * *